United States Patent
Kuhl et al.

(10) Patent No.: US 11,512,403 B2
(45) Date of Patent: Nov. 29, 2022

(54) SYSTEM AND METHOD FOR CARBON DIOXIDE REACTOR CONTROL

(71) Applicant: Twelve Benefit Corporation, Berkeley, CA (US)

(72) Inventors: Kendra Kuhl, Oakland, CA (US); Etosha Cave, Berkeley, CA (US); Nicholas Flanders, San Francisco, CA (US); Sichao Ma, Dublin, CA (US); Qun Zeng, Oakland, CA (US); George Leonard, Oakland, CA (US)

(73) Assignee: Twelve Benefit Corporation, Berkeley, CA (US)

( * ) Notice: Subject to any disclaimer, the term of this patent is extended or adjusted under 35 U.S.C. 154(b) by 506 days.

(21) Appl. No.: 16/254,255

(22) Filed: Jan. 22, 2019

(65) Prior Publication Data
US 2019/0226103 A1   Jul. 25, 2019

Related U.S. Application Data

(60) Provisional application No. 62/685,771, filed on Jun. 15, 2018, provisional application No. 62/619,996, (Continued)

(51) Int. Cl.
| | | |
|---|---|---|
| C25B 15/08 | (2006.01) | |
| C25B 15/02 | (2021.01) | |
| C25B 1/02 | (2006.01) | |
| C25B 9/23 | (2021.01) | |
| C25B 9/70 | (2021.01) | |
| C25B 11/031 | (2021.01) | |

(52) U.S. Cl.
CPC ............... *C25B 15/02* (2013.01); *C25B 1/02* (2013.01); *C25B 9/23* (2021.01); *C25B 9/70* (2021.01); *C25B 11/031* (2021.01)

(58) Field of Classification Search
CPC ........... C25B 15/08; C25B 15/02; C25B 9/17; C25B 9/70; C25B 9/00; C25C 7/00; C25C 7/02; C25C 1/00; C25C 3/00
See application file for complete search history.

(56) References Cited

U.S. PATENT DOCUMENTS

| | | |
|---|---|---|
| 4,042,496 A | 8/1977 | Tsushima et al. |
| 4,089,758 A | 5/1978 | McAloon |

(Continued)

FOREIGN PATENT DOCUMENTS

| | | |
|---|---|---|
| CA | 1071143 | 2/1980 |
| CN | 109921060 A | 6/2019 |

(Continued)

OTHER PUBLICATIONS

"International Search Report and Written Opinion of the ISA, dated Apr. 30, 2019, for application No. PCT/US19/14586."

(Continued)

*Primary Examiner* — Zulmariam Mendez
(74) *Attorney, Agent, or Firm* — Weaver Austin Villenueve & Sampson LLP

(57) ABSTRACT

A system preferably including a carbon dioxide reactor. A method for carbon dioxide reactor control, preferably including selecting carbon dioxide reactor aspects based on a desired output composition, running a carbon dioxide reactor under controlled process conditions to produce a desired output composition, and/or altering the process conditions to alter the output composition.

33 Claims, 5 Drawing Sheets

Related U.S. Application Data filed on Jan. 22, 2018, provisional application No. 62/620,109, filed on Jan. 22, 2018.

(56) References Cited

U.S. PATENT DOCUMENTS

| | | |
|---|---|---|
| 4,176,215 A | 11/1979 | Molnar et al. |
| 4,609,440 A | 9/1986 | Frese et al. |
| 4,828,941 A | 5/1989 | Sterzel |
| 4,921,586 A | 5/1990 | Molter |
| 5,039,389 A | 8/1991 | McMichael |
| 5,601,937 A | 2/1997 | Isenberg |
| 5,992,008 A | 11/1999 | Kindler |
| 6,358,651 B1 | 3/2002 | Chen et al. |
| 7,605,293 B2 | 10/2009 | Olah et al. |
| 7,608,356 B2 | 10/2009 | Risen et al. |
| 7,704,369 B2 | 4/2010 | Olah et al. |
| 7,883,817 B2 | 2/2011 | Hori et al. |
| 8,131,859 B2 | 3/2012 | Fujii et al. |
| 8,137,859 B2 | 3/2012 | Shin et al. |
| 8,268,026 B2 | 9/2012 | Norbeck et al. |
| 8,277,631 B2 | 10/2012 | Eastman et al. |
| 8,652,104 B2 | 2/2014 | Goral et al. |
| 8,652,704 B2 | 2/2014 | Sano et al. |
| 8,658,016 B2 | 2/2014 | Lakkaraju et al. |
| 8,721,866 B2 | 5/2014 | Sivasankar et al. |
| 8,845,875 B2 | 9/2014 | Teamey et al. |
| 8,845,878 B2 | 9/2014 | Cole et al. |
| 8,956,990 B2 | 2/2015 | Masel et al. |
| 9,012,345 B2 | 4/2015 | Masel et al. |
| 9,145,615 B2 | 9/2015 | Zhai et al. |
| 9,181,625 B2 | 11/2015 | Masel et al. |
| 9,193,593 B2 | 11/2015 | Masel et al. |
| 9,370,773 B2 | 6/2016 | Masel et al. |
| 9,464,359 B2 | 10/2016 | Masel et al. |
| 9,481,939 B2 | 11/2016 | Masel et al. |
| 9,555,367 B2 | 1/2017 | Masel et al. |
| 9,566,574 B2 | 2/2017 | Masel et al. |
| 9,580,824 B2 | 2/2017 | Masel et al. |
| 10,280,378 B2 | 5/2019 | Masel |
| 10,648,091 B2 | 5/2020 | Kuhl et al. |
| 10,822,709 B2 | 11/2020 | Kulh et al. |
| 10,975,480 B2 | 4/2021 | Masel |
| 10,975,481 B2 | 4/2021 | Guo et al. |
| 2003/0059658 A1 | 3/2003 | Kohler et al. |
| 2005/0239912 A1 | 10/2005 | Arcella et al. |
| 2006/0016685 A1 | 1/2006 | Hawkins et al. |
| 2008/0318093 A1 | 12/2008 | Lee et al. |
| 2009/0117436 A1 | 5/2009 | Choi et al. |
| 2009/0155102 A1 | 6/2009 | Park et al. |
| 2010/0137457 A1 | 6/2010 | Kaplan |
| 2010/0159347 A1 | 6/2010 | Choi et al. |
| 2010/0324256 A1 | 12/2010 | Ooms et al. |
| 2012/0171583 A1 | 7/2012 | Bocarsly et al. |
| 2012/0328942 A1 | 12/2012 | Thomas-Alyea et al. |
| 2013/0105304 A1 | 5/2013 | Kaczur et al. |
| 2013/0118911 A1 | 5/2013 | Sivasankar et al. |
| 2013/0345325 A1 | 12/2013 | Lecomte et al. |
| 2014/0027303 A1 | 1/2014 | Cole et al. |
| 2014/0034506 A1 | 2/2014 | Teamey et al. |
| 2014/0093799 A1 | 4/2014 | Masel et al. |
| 2014/0206894 A1 | 7/2014 | Cole et al. |
| 2014/0206896 A1 | 7/2014 | Sivasankar et al. |
| 2015/0010804 A1 | 1/2015 | Laramie et al. |
| 2015/0030888 A1 | 1/2015 | Popat et al. |
| 2015/0057458 A1 | 2/2015 | Schjodt et al. |
| 2015/0064602 A1 | 3/2015 | Lee et al. |
| 2015/0232999 A1 | 8/2015 | Busskamp et al. |
| 2015/0329979 A1 | 11/2015 | Reytier et al. |
| 2016/0107154 A1 | 4/2016 | Masel et al. |
| 2016/0161869 A1 | 6/2016 | Bisselink |
| 2017/0183789 A1 | 6/2017 | Matthews et al. |
| 2017/0321333 A1 | 11/2017 | Kuhl et al. |
| 2017/0321334 A1 | 11/2017 | Kuhl et al. |
| 2017/0328239 A1 | 11/2017 | Fleischer et al. |
| 2018/0057950 A1 | 3/2018 | Co et al. |
| 2018/0086985 A1 | 3/2018 | von Olshausen et al. |
| 2018/0194632 A1 | 7/2018 | Jakobsson et al. |
| 2018/0257057 A1 | 9/2018 | Motoshige et al. |
| 2018/0265440 A1 | 9/2018 | Kudo et al. |
| 2019/0032228 A1 | 1/2019 | Krause et al. |
| 2019/0062931 A1 | 2/2019 | Stark et al. |
| 2019/0093241 A1 | 3/2019 | Baldauf et al. |
| 2020/0095124 A1 | 3/2020 | Rueger |
| 2020/0216968 A1 | 7/2020 | Hunegnaw et al. |
| 2020/0220185 A1 | 7/2020 | Ma et al. |
| 2020/0240023 A1 | 7/2020 | Cave et al. |
| 2020/0308718 A1 | 10/2020 | Patru et al. |
| 2020/0354843 A1 | 10/2020 | Khul et al. |
| 2020/0376479 A1 | 12/2020 | Masel |
| 2021/0002775 A1 | 1/2021 | Matsumoto et al. |
| 2021/0381116 A1 | 12/2021 | Kashi et al. |
| 2021/0387139 A1 | 12/2021 | Voskian et al. |

FOREIGN PATENT DOCUMENTS

| | | |
|---|---|---|
| DE | 102015201132 A1 | 7/2016 |
| DE | 102015214592 A1 | 2/2017 |
| DE | 102016207420 A1 | 10/2017 |
| DE | 10 2017 208610 | 11/2018 |
| EP | 1193329 A1 | 4/2002 |
| EP | 1038993 A1 | 9/2002 |
| EP | 3378968 | 9/2018 |
| EP | 3378968 A | 9/2018 |
| EP | 3434810 A1 | 1/2019 |
| EP | 3453064 A1 | 3/2019 |
| EP | 3626861 A1 | 3/2020 |
| EP | 3670700 A1 | 6/2020 |
| JP | H06 145379 | 5/1994 |
| JP | H10507305 | 7/1998 |
| JP | 2013-520779 | 6/2013 |
| JP | 2014-525115 A | 9/2014 |
| KR | 100962903 | 6/2010 |
| KR | 10-20140142185 | 12/2014 |
| WO | WO96/11507 | 4/1996 |
| WO | 2007041872 A1 | 4/2007 |
| WO | WO2008124538 | 10/2008 |
| WO | WO2011-104542 | 9/2011 |
| WO | 2012006240 A1 | 1/2012 |
| WO | WO2012-174463 | 12/2012 |
| WO | 2013006710 A2 | 1/2013 |
| WO | 2013016447 A2 | 1/2013 |
| WO | WO2013/089112 | 6/2013 |
| WO | 2014018091 A1 | 1/2014 |
| WO | 2014032000 A1 | 2/2014 |
| WO | 2014042781 A2 | 3/2014 |
| WO | 2014043651 A2 | 3/2014 |
| WO | 2014046797 A2 | 3/2014 |
| WO | 2014160529 A1 | 10/2014 |
| WO | 2015035521 A1 | 3/2015 |
| WO | WO-2015184388 A1 | 12/2015 |
| WO | WO 2016/039999 A1 | 3/2016 |
| WO | 2017014635 A1 | 1/2017 |
| WO | WO2017021083 A1 | 2/2017 |
| WO | WO2017190234 A1 | 11/2017 |
| WO | WO-2018001637 A1 | 1/2018 |
| WO | WO-2019051609 A1 | 3/2019 |
| WO | WO-2019136018 A2 | 7/2019 |
| WO | WO2020057998 A1 | 3/2020 |

OTHER PUBLICATIONS

Aeshala, L.M. et al., Effect of solid polymer electrolyte on electrochemical reduction of CO2, Separation and Purification Technology 94, (2012), pp. 131-137.

Kriescher, Stefanie M.A. et al, A membrane electrode assembly for the electrochemical synthesis of hydrocarbons From CO2)g) and Ho2(g), Electrochemistry Communications, 50 (2015), pp. 64-68.

Srinivasan, S. et al., Advances in Solid Polymer Electrolyte Fuel Cell Technology with Low Platinum Loading Electrodes, Journal of Power Sources, 22 (1988) pp. 359-375.

Zhu, Wenlei et al., Monodisperse Au Nanoparticles for Selective Electrocatalytic Reduction of CO2 to CO,Journal of he American Chemical Society, 2013, 135, pp. 16833-16836.

(56) References Cited

OTHER PUBLICATIONS

Delacourt, Charles; et al.Design of Electrochemical Cell Makeing Syngas (CO + H2) from CO2 and H2O Reduction at Room Temperature, J. Electrochem. Soc. 2008 155(1): B42-B49.
Spets et al. Direct Glucose Fuel Cell With Anion Exchange Membrane in the Near Neutral State Electrolyte, International Journal of Electrochemical Science 7, 11696-11705, Dec. 1, 2012, entire document, http.electrochemsci.org/papers/vol7/71211696.pdf.
Office Action dated Nov. 1, 2018, in U.S. Appl. No. 15/586,173.
Office Action dated Apr. 2, 2019, in U.S. Appl. No. 15/586,173.
Final Office Action dated Jan. 8, 2020, in U.S. Appl. No. 15/586,173.
Notice of Allowance dated Jan. 29, 2020, in U.S. Appl. No. 15/586,173.
Office Action dated Sep. 16, 2020, in U.S. Appl. No. 16/842,659.
Office Action dated Nov. 1, 2018, in U.S. Appl. No. 15/586,182.
Final Office Action dated Apr. 2, 2019, in U.S. Appl. No. 15/586,182.
Office Action dated Dec. 30, 2019, in U.S. Appl. No. 15/586,182.
Office Action dated Jul. 2, 2020, in U.S. Appl. No. 15/586,182.
Notice of Allowance dated Sep. 16, 2020, in U.S. Appl. No. 15/586,182.
Office Action dated Jan. 26, 2021, in U.S. Appl. No. 16/736,615.
CA First Office Action dated Oct. 15, 2019, in Application No. 3,022,807.
CA First Office Action dated Sep. 30, 2019, in Application No. 3,022,812.
CA Second Office Action dated Oct. 14, 2020, in Application No. 3,022,807.
CA Second Office Action dated Aug. 28, 2020, in Application No. 3,022,812.
EP Search Report dated Dec. 2, 2019, in Application No. 17793299.3.
EP Office Action dated Sep. 4, 2020, in Application No. 17793299.3.
EP Search Report dated Dec. 4, 2019, in Application No. 17793300.9.
IN Office Action dated Aug. 19, 2020, in Application No. 201817041222.
IN Office Action dated Aug. 10, 2020, in Application No. 201817041221.
JP Office Action dated Jan. 28, 2020, in Application No. 2018-558130.
JP Office Action dated Jan. 28, 2020, in Application No. 2018-558138.
International Search Report and Written Opinion dated Aug. 7, 2017, in PCT Application No. PCT/US2017/030935.
International Preliminary Report on Patentability dated Nov. 15, 2018, in PCT Application No. PCT/US2017/030935.
International Search Report and Written Opinion dated Sep. 13, 2017, in PCT Application No. PCT/US2017/030936.
Preliminary Report on Patentability dated Nov. 6, 2018, in PCT Application No. PCT/US2017/030936.
International Search Report and Written Opinion dated Apr. 8, 2020, in PCT Application No. PCT/US2019/067169.
International Search Report and Written Opinion dated Mar. 19, 2020, in PCT Application No. PCT/US2019/063471.
International Search Report and Written Opinion dated Apr. 2, 2020, in PCT Application No. PCT/US2020/012600.
Choo et al. Modulated Ionomer Distribution in the Catalyst Layer of Polymer Electrolyte Membrane Fuel Cells for High Temperature Operation, Chemsuschem, vol. 7, Issue 8, Aug. 2014, pp. 2335-2341.
Delacourt, C., "Electrochemical reduction of carbon dioxide and water to syngas (CO + H2) at room temperature," Manuscript, Environmental Energy Technologies Division, Lawrence Berkeley National Laboratory and Department of Chemical Engineering, University of California Berkeley, 2006-2007, 171 pages.
Endrodi, B. et al., "Continuous-flow electroreduction of carbon dioxide," Progress in Energy and Combustion Science, vol. 62, Jun. 13, 2017, pp. 133-154.
Lu et al. "A selective and efficient electrocatalyst for carbon dioxide reduction," Nature communication, Jan. 30, 2014.
Pătru, A., et al., "Design Principles of Bipolar Electrochemical Co-Electrolysis Cells for Efficient Reduction of Carbon Dioxide from Gas Phase at Low Temperature," Journal of the Electrochemical Society, 166 (2), (2019), pp. F34-F43.
Ren, D., et al., "Selective Electrochemical Reduction of Carbon Dioxide to Ethylene and Ethanol on Copper(I) Oxide Catalysts," ACS Catal., 2015, 5, pp. 2814-2821.
Ren, D., et al., "The effects of currents and potentials on the selectivities of copper toward carbon dioxide electroreduction," Nature Communication, 2018, 9:925, pp. 1-8.
Zhu, Wenlei et al., "Active and Selective Conversion of CO2 to CO on Ultrathin Au Nanowires," Journal of American Chemical Society, 2014, 136, pp. 16132-16135.
U.S. Appl. No. 17/030,172, filed Sep. 23, 2020, Kuhl et al.
U.S. Appl. No. 16/949,538, filed Nov. 2, 2020, Kuhl et al.
U.S. Appl. No. 17/247,036, filed Nov. 24, 2020, Ziyang Huo.
Badami, M. "Leakage effects on the performance characteristics of a regenerative blower for the hydrogen recirculation of a PEM fuel cell," Energy Conversion and Management, vol. 55, Mar. 2012, pp. 20-25.
Badami, M., "Theoretical model with experimental validation of a regenerative blower for hydrogen recirculation in a PEM fuel cell system," Energy Conversion and Management, vol. 51, Issue 3, Mar. 2010, pp. 553-560.
Blaszczyk, J., "In-Situ Anode Recirculation Rate Measurement Method (Draft)," Ogura Industrial Corporation, Ballard Power Systems, Full Cell Seminar & Exposition 2011, Oct. 31-Nov. 3, 2011, 22 pages.
Endrodi, B., "Multilayer Electrolyzer Stack Converts Carbon Dioxide to Gas Products at High Pressure with Multilayer Electrolyzer Stack Converts Carbon," ACS Energy Lett. 2019, 4, 1770-1777.
Hori, Y., "Chapter 48: $Co_2$-reduction, catalyzed by metal electrodes," Handbook of Fuel Cells—Fundamentals, Technology and Applications, vol. 2, Electrocatalysis, 2003. pp. 720-733.
James, B.D., et al. 2017 DOE Hydrogen and Fuel Cells Program Review, Fuel Cell Systems Analysis, Strategic Analysis, Project IDI FC163, Jun. 8, 2017, 34 pages.
Li, et al., "Electrolysis of $CO_2$ to Syngas in Bipolar Membrane-Based Electrochemical Cells," ACS Publications, ACS Energy Letters, 2016, 1, pp. 1149-1153.
Li, et al., "Electrolytic Conversion of Bicarbonate into CO in a Flow Cell," Cell Press, Joule 3, Jun. 19, 2019, pp. 1487-1497.
Nafion XL, Ion Exchange Materials, "Perfluorosulfonic Acid (PFSA) Membranes for Fuel," CellsFuelCellStore, Product Bulletin P-22, 4 pages.
Sharma, et al., "Electrocatalytic conversion of carbon dioxide to fuels: a review on the interaction between $CO_2$ and the liquid electrolyte," WIREs Energy Environ 2017, 6:e239. doi: 10.1002/wene.239, pp. 1-21.
Verma, et al., "The effect of electrolyte composition on the electroreduction of $CO_2$ to CO on Ag based gas diffusion electrodes," Phys. Chem. Chem. Phys., 2016, 18, pp. 7075-7084.
Xia, Chuan, et al., "Continuous production of pure liquid fuel solutions via electrocatalytic CO2 reduction using solid electrolyte devices," Nature Energy, http://www.nature.com/natureenergy; https://doi.org/10.1038/s41560-019-0451-x.
Kim, C., et al., "Impact of Pulsed Electrochemical Reduction of $CO_2$ on the formation of $C_{2+}$ Products over Cu," ACS Catal., 2020, 10, 12403-12413.
Kimura, K.W., et al., "Selective Electrochemical CO2 Reduction During Pulsed Potential Stems From Dynamic Interface," ACS Catalysis, ACS Paragon Plus Environment, University of Illinois at Urbana-Champaign, Downloaded from pubs.acs.org on Jun. 30, 2020, 31 pages.
Casebolt, R., et al., "Effect of Electrolyte Composition and Concentration on Pulsed Potential Electrochemical CO2 Reduction," ChemElectroChem, Chemistry Europe, Accepted Manuscript, 25 pp.
Xu, Y., et al., "Self-Cleaning CO2 Reduction Systems: Unsteady Electrochemical Forcing Enables Stability," ACS Energy Letters, 2021, 6, pp. 809-815.
Co-pending U.S. Appl. No. 17/452,395, filed Oct. 26, 2021.

(56) References Cited

OTHER PUBLICATIONS

EP search report dated Sep. 14, 2021, in application No. EP19741371.9.
IN Office Action dated Feb. 16, 2022, in Application No. IN202037034886.
International Search Report and Written Opinion dated Feb. 28, 2022, in Application No. PCT/US2021/044378.
Liew, F. et al., "Gas Fermentation—A Flexible Platform for Commercial Scale Production of Low-Carbon-Fuels and Chemicals from Waste and Renewable Feedstocks", Frontiers in Microbiology, May 11, 2016, vol. 7, No. 694, pp. 1-28.
Shi, L. et al., "A shorted membrane electrochemical cell powered by hydrogen to remove $CO_2$ from the air feed of hydroxide exchange membrane fuel cells", Nature Energy, Mar. 2022, vol. 7, 36 pages.
U.S. Appl. No. 17/444,356, inventors Flanders et al., filed Aug. 8, 2021.
Voskian, S. et al., "Faradaic electro-swing reactive adsorption for $CO_2$ capture", Energy & Environmental Science, 2019, vol. 12, pp. 3530-3547.
AU Office Action dated Sep. 7, 2022, in Application No. AU2019210132.

SYSTEM AND METHOD FOR CARBON DIOXIDE REACTOR CONTROL

CROSS-REFERENCE TO RELATED APPLICATIONS

This application claims the benefit of U.S. Provisional Application Ser. No. 62/619,996, filed on 22 Jan. 2018, U.S. Provisional Application Ser. No. 62/620,109, filed on 22 Jan. 2018, and U.S. Provisional Application Ser. No. 62/685,771, filed on 15 Jun. 2018, each of which is incorporated in its entirety by this reference.

STATEMENT OF GOVERNMENT SUPPORT

This invention was made with government support under Award Number 1738554 awarded by the National Science Foundation, and under Award Numbers DE-SC0015872, DE-SC0017725, and DE-SC0018549 awarded by the Department of Energy Office of Science. The government has certain rights in the invention.

TECHNICAL FIELD

This invention relates generally to the carbon dioxide reactor field, and more specifically to a new and useful system and method for reactor control in the carbon dioxide reactor field.

BACKGROUND

Typical systems and methods for carbon dioxide reactor control focus on maximization of aspects relating to production of carbon monoxide (CO) and/or other carbon-containing products (CCPs), such as maximizing ratios of CO to other reactor products (e.g., CO:$H_2$ ratio), CO concentration, and/or total CO output or output rate.

Thus, there is a need in the carbon dioxide reactor field to create a new and useful system and method for reactor control.

DESCRIPTION OF THE PREFERRED EMBODIMENTS

Figure 1:
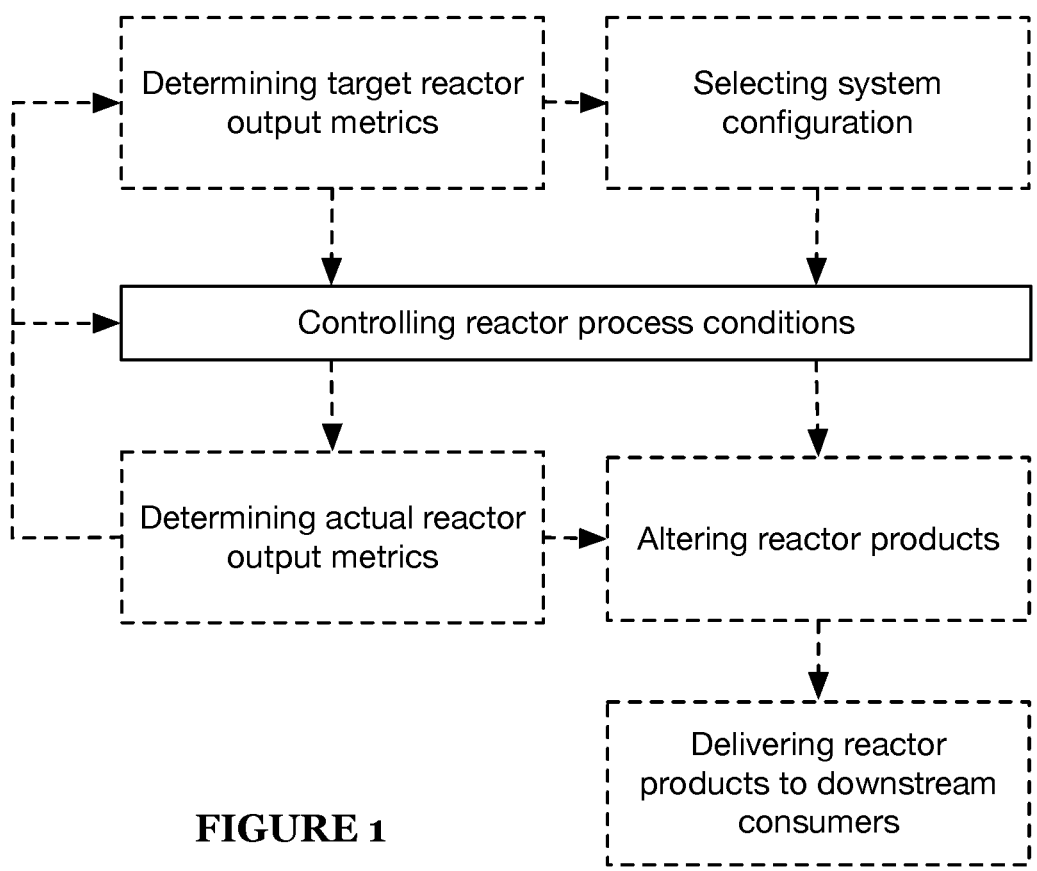
FIG. 1 is a flow chart representation of an embodiment of the method.
Figure 2A:
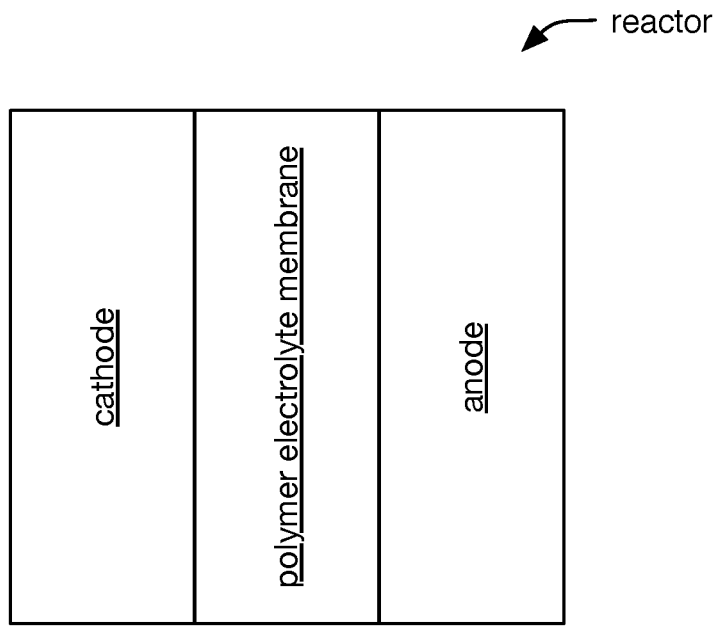
FIGS. 2A-2B are a schematic representation of an embodiment of the system and a variation of the embodiment, respectively.
Figure 2B:
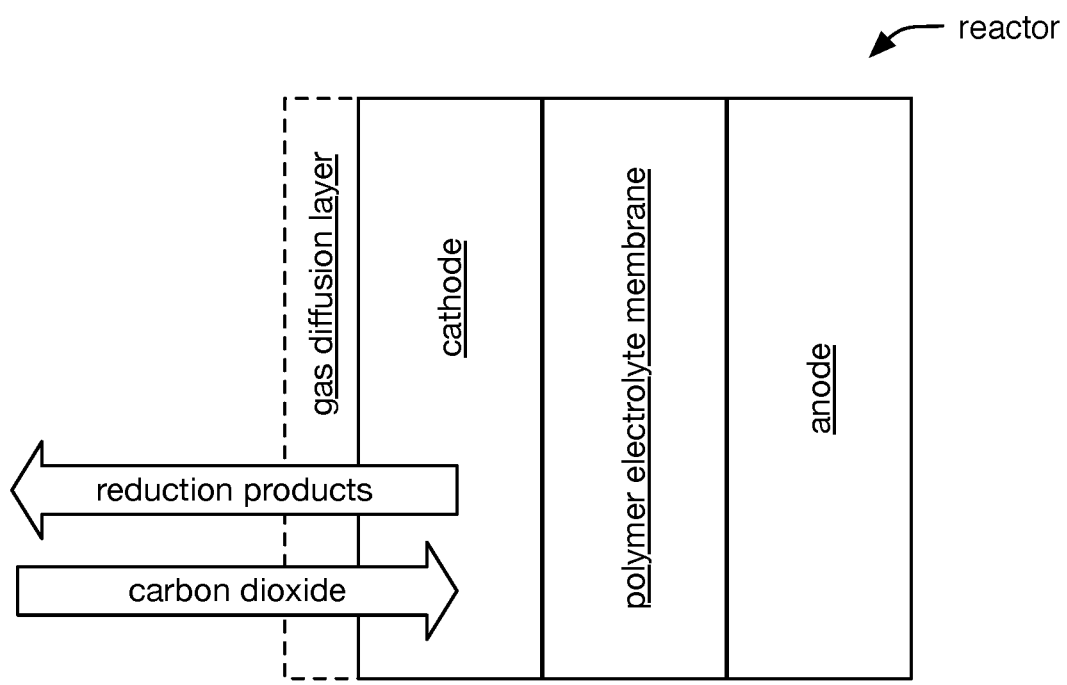
Figure 2C:
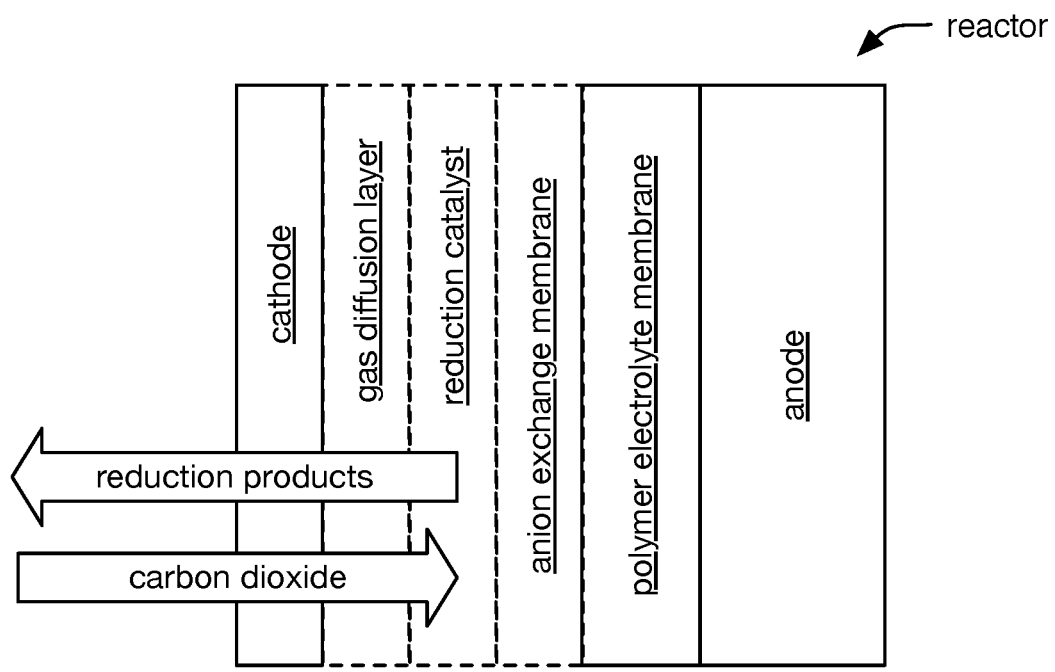
FIGS. 2C-2D are schematic representations of a first and second example, respectively, of the embodiment of the system.
Figure 2D:
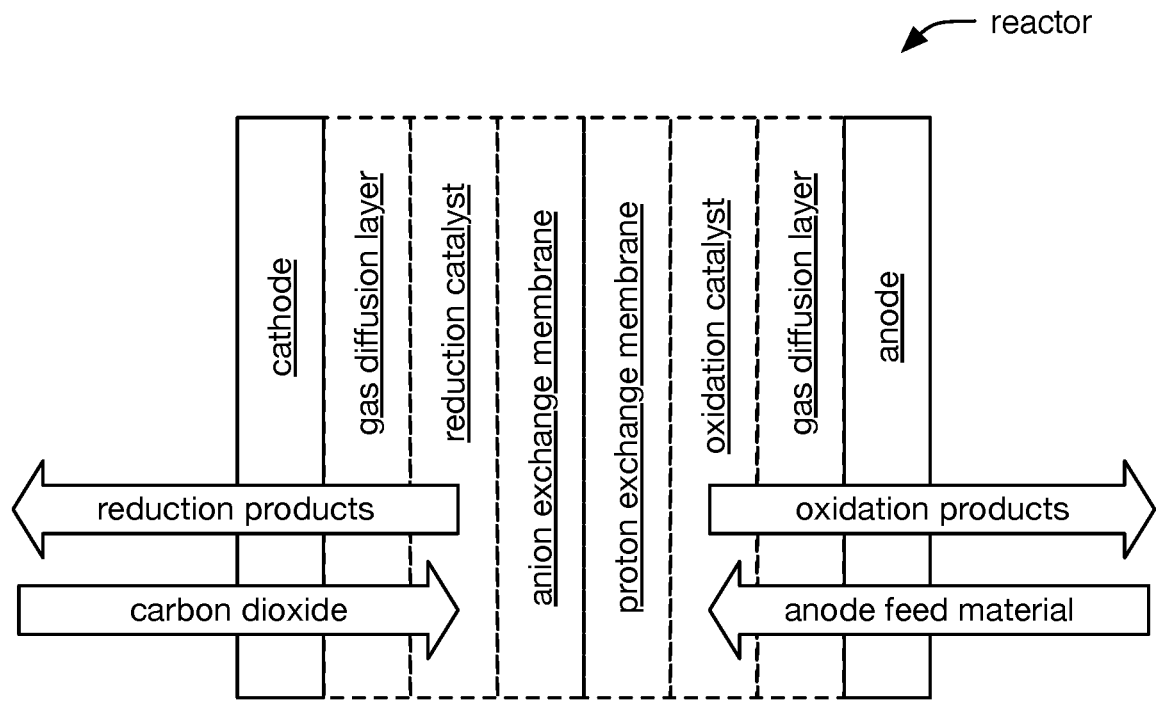

The following description of the preferred embodiments of the invention is not intended to limit the invention to these preferred embodiments, but rather to enable any person skilled in the art to make and use this invention.

1. OVERVIEW

A system and/or method for carbon dioxide reactor control preferably functions to control aspects of reactor production, such as aspects relating to quantity, concentration, and/or ratios of reactor products. Typical systems and methods for carbon dioxide reactor control have focused on maximization of aspects relating to production of carbon monoxide (CO) and/or other carbon-containing products (CCPs) (e.g., carbon-containing species (CCSs)), such as maximizing ratios of CO to other reactor products (e.g., CO:$H_2$ ratio), CO concentration, and/or total CO output or output rate.

However, the inventors have discovered that, for some applications, simply maximizing aspect values can be undesirable, and that arbitrary control of such aspects (e.g., dynamic or selective aspect control to meet a value within a range of target aspect values), rather than simple maximization, can be beneficial. For example, it can be desirable to selectively control the CO:$H_2$ ratio of the reactor products (e.g., enabling arbitrary control within a spectrum from the highest CO:$H_2$ ratio possible for a given system and/or process, down to approximately 1:3 CO:$H_2$ or lower). With such control, the reactor output can be more effectively used (e.g., wherein the reactor outputs are directly fed to a subsequent input) for applications such as liquid hydrocarbon production via the Fischer-Tropsch process (e.g., controlling the reactor to produce an approximately 1:2 CO:$H_2$ output ratio), chemical synthesis processes, and/or gas (e.g., syngas) fermentation processes (e.g., bioreactors).

2. SYSTEM

The system can include a carbon dioxide reactor, such as a reactor that generates carbon-containing products (e.g., CO, alkanes, alcohols, etc.) and/or hydrogen from an input (preferably an input stream, such as a fluid stream) that includes carbon dioxide (e.g., as shown in FIGS. 2A-2D). The reactor preferably accepts a gas-phase carbon dioxide input and/or performs the reaction(s) using gas-phase carbon dioxide (e.g., is a gas-phase reactor), but can additionally or alternatively accept liquid-phase carbon dioxide, supercritical fluid-phase carbon dioxide, solid-phase carbon dioxide, and/or any other suitable carbon dioxide input. The reactor is preferably an electrolyzer (e.g., electrochemical reactor), more preferably a gas-phase polymer-electrolyte membrane electrolyzer, but can additionally or alternatively include any other suitable reactors.

The reactor preferably includes one or more: electrodes (e.g., anode, cathode), catalysts (e.g., within and/or adjacent the cathode and/or anode), gas diffusion layers (e.g., adjacent the cathode and/or anode), and/or flow fields (e.g., defined within and/or adjacent the electrodes and/or gas diffusion layers, such as one or more channels defined opposing the cathode across the gas diffusion layer). In some embodiments, the reactor includes one or more polymer electrolyte membranes (PEMs), preferably providing ionic communication between the anode and cathode of the reactor. In one variation, the reactor includes a membrane stack including: a cathode layer including a reduction catalyst and an ion-conducting polymer; a PEM membrane (e.g., bipolar membrane, monopolar membrane, etc.; membrane including one or more anion conductors such as anion exchange membranes (AEMs), proton and/or cation conductors such as proton exchange membranes, and/or any other suitable ion-conducting polymers; membrane including one or more buffer layers; etc.); and an anode layer including an oxidation catalyst and an ion-conducting polymer. The ion-conducting polymers of each layer can be the same or different ion-conducting polymers.

In some embodiments, one or more of the catalysts (e.g., reduction catalyst, oxidation catalyst) can include catalyst particles (e.g., defining a porous network of particles), preferably nanoparticles. One or more of the catalysts can additionally or alternatively include one or more polymer electrolytes, preferably wherein the polymer electrolyte is mixed with the catalyst nanoparticles (e.g., arranged within the porous network, such as loaded into the open regions defined by the porous network). The catalyst nanoparticles can define one or more characteristic sizes (e.g., mean size, median size, minimum size, maximum size, size at a particular percentile of the particle size distribution, etc.), and/or the porous network can define a porosity (e.g., fraction of empty space within the network), density, circuitousness (e.g., characteristic path length per layer thickness, area, and/or volume, such as path through the empty spaces or path along interconnected particles, etc.), and/or any other suitable porous network metrics.

In one example ("reactor configuration A"), the system includes: a carbon fiber paper gas diffusion layer (e.g., Sigracet 39BC); a catalyst layer including approximately 20% by weight of approximately 4 nm gold particles on Vulcan carbon and an anion-conducting polymer (e.g., Fumasep FAA-3); a bipolar PEM; and a flow field such as a single, double, triple, or quadruple serpentine flow field or an interdigitated flow field. In a specific example, the electrodes define an area of approximately 25 $cm^2$, but can additionally or alternatively define any other suitable area.

In some embodiments, the reactor includes one or more elements such as described in U.S. patent application Ser. No. 15/586,182, filed 3 May 2017 and titled "Reactor with Advanced Architecture for the Electrochemical Reaction of $CO_2$, CO and Other Chemical Compounds", which is hereby incorporated in its entirety by this reference. However, the reactor can additionally or alternatively include any other suitable elements in any suitable arrangement.

Figure 3:
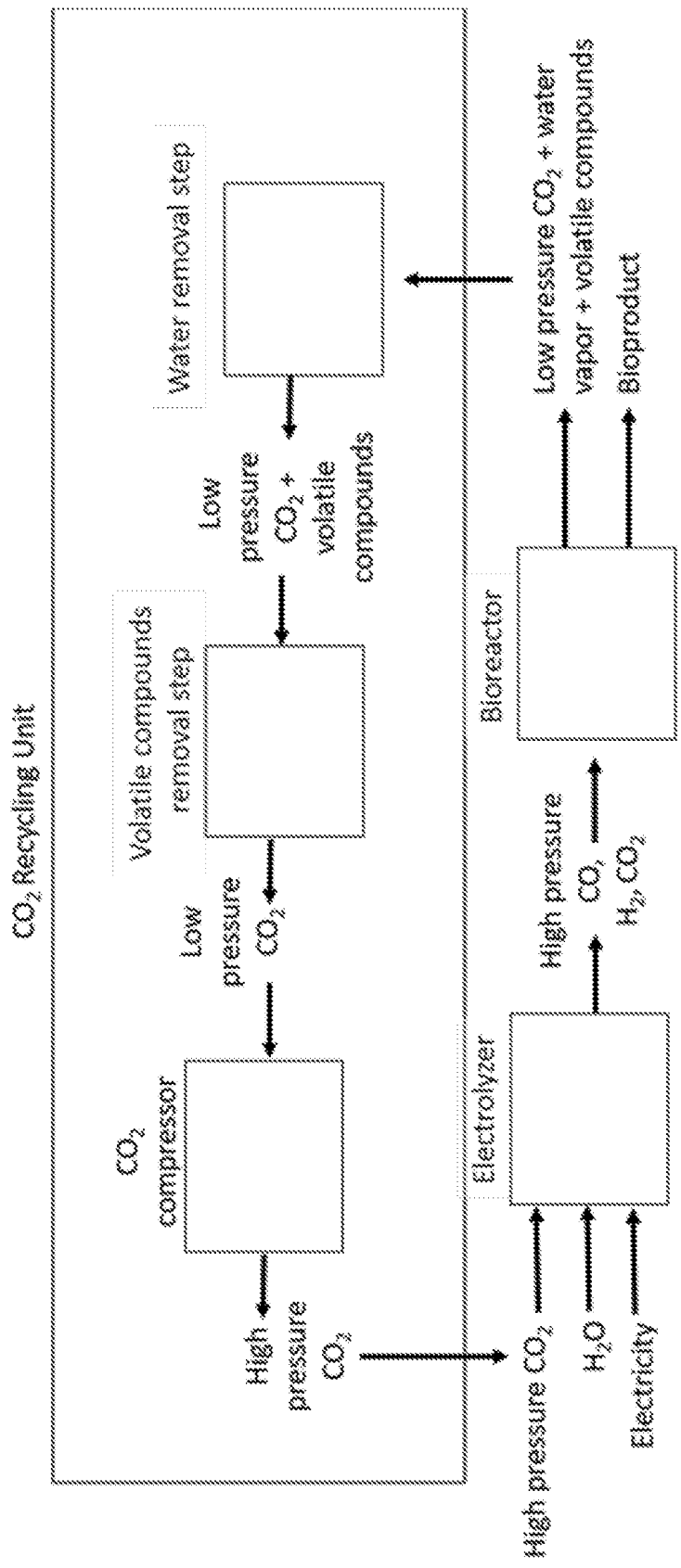
FIG. 3 is a schematic representation of an example of the system.

Additional information regarding optional embodiments and/or elements of the system and/or method (e.g., as shown by way of example in FIG. 3) are provided below.

A system of the invention may optionally include an upstream source of carbon dioxide input, connected to an input of a carbon dioxide reactor of the invention, including one or more of: a biogas production system; an ethanol fermentation system such as corn ethanol production system, a beer production system, a wine production system; a natural gas processing system; a cement production system; a blast furnace system, for example a steel blast furnace system, capable of producing blast furnace gas; a coke gas production system; power plant systems, such as petroleum power plant systems, natural gas power plant systems, coal power plant systems; petroleum refinery systems; ethylene production systems; ammonia production systems; hydrogen production systems, such as water-gas shift systems; natural gas processing plants (e.g., Benfield processing); ethylene oxide production systems; aluminum smelting systems; liquified natural gas (LNG) production systems; solid feedstock gasifiers (e.g., municipal solid waste, biomass, or coal feedstocks); reformers (e.g., steam methane reformers, autothermal reformers); systems performing Boudouard reactions; direct air capture (DAC) of carbon dioxide process; and/or any other system capable of producing carbon dioxide. An upstream source of carbon dioxide may be connected directly to an input of a carbon dioxide reactor of the invention (e.g., serves as the input, such as connected to the reduction catalyst via the cathode flow field and/or gas diffusion layer, etc.) or alternatively the upstream source may be connected to a purification system; a gas compression system; or both a purification system and a gas compression system, in either order; which then connect to an input of a carbon dioxide system of the invention. Multiple purification and/or gas compression systems (e.g., scrubbers, etc.) may be employed.

A system of the invention may further include an input of a downstream system, capable of transforming chemical outputs from a carbon dioxide reactor of the invention, connected to an output of a carbon dioxide reactor of the invention. A downstream system of the invention may include one or more of: a bioreactor system; a Fischer-Tropsch system; an anaerobic fermentation system; a syngas fermentation system; a polyketone production system; a formate production system; a formate ester production system; a formamide production system; a hydroformylation system; a methanol synthesis system; an ethylene polymerization system; and/or any other system capable of transforming chemical outputs from a carbon dioxide reactor of the invention. A carbon dioxide reactor output of the invention may be directly connected (e.g., via the cathode flow field and/or gas diffusion layer) to a downstream system, and/or the carbon dioxide reactor output may be connected to a purification system; a gas compression system; or both a purification system and a gas compression system, in either order; which then preferably connect to an input of a downstream system. Multiple purification systems and/or gas compression systems may be employed.

A downstream system of the invention may produce carbon dioxide output in addition to other product outputs. A system of the invention may further include a connection between a carbon dioxide containing output of a downstream system and an input of a carbon dioxide reactor. The carbon dioxide containing output of a downstream system may be directly connected to an input of a carbon dioxide reactor of the invention or alternatively the downstream carbon dioxide containing output may be connected to a purification system; a gas compression system; or both a purification system and a gas compression system, in either order; which then connect to an input of a carbon dioxide reactor of the invention. Multiple purification systems and/or gas compression systems may be employed.

A carbon dioxide reactor of the invention can make a range of products (for example, methane, ethylene, carbon monoxide (CO), molecular hydrogen ($H_2$), ethanol, formate, formic acid, acetate, acetic acid, propanol, butanol, ethane, methanol) that can be used in downstream systems and processes. Different carbon dioxide reactors (e.g., including different layer stacks, catalysts and/or catalyst layers, PEMs, flow fields, gas diffusion layers, cell compression configurations, and/or any other suitable aspects, etc.) can be used to achieve different reduction products (e.g., product compositions such as HCR); however, different reduction products can additionally or alternatively be achieved by adjusting the operation parameters, and/or be otherwise achieved. Many possible downstream systems and processes release $CO_2$ (examples include bio-utilization of methane, bio-utilization of formic acid or formate, bio-utilization of acetic acid or acetate, Fischer-Tropsch, methanol synthesis). A carbon dioxide recycling system sized appropriately for the specific application can be used in many of these cases to return $CO_2$ from the downstream system output to an input of a carbon dioxide reactor of the invention to increase the carbon efficiency of the overall process.

A system of the invention may further include a source of electrical energy connected to a carbon dioxide reactor of the invention, the source of electrical energy comprising one or more of: a solar electrical energy production system; a wind electrical energy production system; a geothermal electrical energy production system; a fossil fuel electrical energy production system; or any other system capable of electrical energy production.

A system of the invention may be employed to store electrical energy in the form of chemical energy. For example, power producers may produce excess power during off-peak usage periods. Systems of the invention are able to respond quickly to a need to consume excess power. They do not need to warm up to operate, and they can be cycled between power on and power off states without deterioration of carbon dioxide reactors of the invention. The ability to respond quickly to power utilization needs allows systems of the invention to work well with intermittent sources of power such as solar electrical energy production systems, and wind electrical energy production systems.

An embodiment of a system of the invention may include an upstream bioreactor, a carbon dioxide reactor, and an intermittent source of electrical energy. When electrical power is available from solar, or wind, or low off-peak demand, or other sources, a power availability detection means may be used to start the carbon dioxide reactor. In addition, the system may boost the output of the upstream bioreactor by, for example, raising the temperature of the upstream bioreactor and increasing the flow of nutrients to the upstream bioreactor. For other upstream carbon dioxide sources, other means may be used as necessary to increase the flow of carbon dioxide to an input of a carbon dioxide reactor of the invention.

A system of the invention may further include means to measure conditions, outputs, and inputs in the systems connected to a carbon dioxide reactor of the invention (e.g., sensors, systems, etc.). Such means may include chemical property measurement systems such as gas chromatographs, mass spectrometers, infrared spectrometers, visible light spectrometers, and/or ultraviolet light spectrometers; temperature detection means; flow rate measurement means; electrical power availability detectors; and/or any other monitoring systems. The monitoring systems can monitor the parameters of the input and/or output streams, the parameters of a component of the input and/or output streams (e.g., the impurity concentration, the carbon dioxide concentration, the product concentration, etc.), and/or monitor any other suitable parameter(s) of the stream.

A system of the invention may further include means for responding to conditions measured in systems connected to a carbon dioxide reactor of the invention (e.g., sensors, systems, etc.). Such means may include systems for adjusting flow rates, temperatures, power consumption or other system parameters.

A system of the invention may include one or more carbon dioxide reactors.

However, the system can additionally or alternatively include any other suitable elements in any suitable arrangement.

3. METHOD

The method is preferably implemented using the system described above, but can additionally or alternatively be implemented using any other suitable system(s). The method preferably includes running the reactor under controlled process conditions (e.g., as described below in further detail) to produce the desired outputs (e.g., CO, $H_2$, etc.) in the desired ratios (e.g., molecular hydrogen-to-CCP ratio (HCR) and/or CCP-to-molecular hydrogen ratio), and/or altering the process conditions to alter the outputs and/or output ratios (e.g., as shown in FIG. 1).

Running the reactor can include: providing one or more inputs (e.g., gasses, liquids, solids, etc.), such as carbon dioxide, a carbon dioxide source (e.g., waste gas), and/or water; causing all or some of the inputs to undergo reactions (e.g., by applying a voltage across the device electrodes), thereby generating products; and/or removing the products from the reactor (e.g., as an output gas stream). Such reactions can include, for example, reducing carbon dioxide and/or water to generate products such as CO (and/or other CCPs, such as formic acid, methanol, glyoxal, methane, acetic acid, glycolaldehyde, ethylene glycol, acetaldehyde, ethanol, ethylene, hydroxyacetone, acetone, allyl alcohol, propionaldehyde, n-propanol, etc.), $H_2$, and/or $O_2$. However, running the reactor can additionally or alternatively include causing any other suitable reactions to occur, and/or can additionally or alternatively include any other suitable elements performed in any suitable manner.

The method can include controlling the system to achieve a desired set of process conditions (e.g., aspects), such as process conditions known to result in a desired output metric value (e.g., a desired $CCP:H_2$ ratio, such as a $CO:H_2$ ratio). The method can additionally or alternatively include altering process conditions, such as based on a difference between actual and desired outputs (e.g., to reduce or eliminate the difference). For example, the method can include: imposing an initial set of process conditions; monitoring one or more output metrics (e.g., $CCP:H_2$ ratio); determining that an output metric differs from a target output metric (e.g., is greater than or less than the target); altering one or more process conditions to reduce the output metric difference (e.g., reducing or increasing a process condition value, such as a condition for which the output metric tends to increase or decrease along with an increasing process condition value); and optionally continuing to monitor the output metrics and/or alter the process conditions (e.g., implementing a closed-loop control of the process conditions based on the output metrics).

The method can optionally include determining the target output metric(s), which functions to determine which parameter(s) or aspect(s) to target (e.g., key parameter for a given application or downstream system). One or more target output metrics can be selected for a given process. The target output metric can be: the output metric associated with (e.g., predetermined for, dictated by, etc.) an application (e.g., applications described above, such as Fischer-Tropes); randomly selected; empirically determined (e.g., through iterative testing and monitoring of downstream application performance); optimized (e.g., based on downstream application operation parameters, reactor operation parameters, etc.); specified by a user; and/or otherwise determined.

The method can optionally include determining the target value for the target output metric, which functions to identify a value (from a range of values) to target. In some variations, the target value can be a maximum or minimum value (e.g., maximum or minimum practically achievable value, theoretical maximum or minimum, etc.). However, the target value can additionally or alternatively not be an extremal value (e.g., can be an intermediate value or range of values between the maximum and minimum). The target value can be: a value associated with the application (e.g., predetermined, pre-associated); randomly selected; empirically determined (e.g., through iterative target value selection, monitoring of downstream application performance, and target value adjustment based on the application performance); optimized (e.g., based on downstream application operation parameters, reactor operation parameters, etc.); or otherwise determined. However, the target value can be any other suitable value, and can be determined in any suitable manner.

Under some conditions, the method may achieve carbon dioxide conversion (e.g., CO fractional yield) greater than 95% (e.g., up to 100%), such as wherein the system, run under such conditions, can achieve at least the threshold conversion metric. However, the method can additionally or alternatively include achieving carbon dioxide conversion greater than 50%, 60%, 70%, 80%, 90%; between 10%-100%, such as 10-40, 30-50, 40-60, 50-70, 60-75, 70-85, 80-95, 90-95, 92-98, and/or 95-100%; and/or any other suitable carbon dioxide conversion.

The method preferably includes feeding the reactor products (or a subset thereof) to a downstream consumer of the products (e.g., as described above, such as regarding applications of the reactor output; as described below, such as in the appendix; etc.). The method can optionally include altering the reactor products after they are produced (e.g., before feeding the altered products to a downstream consumer, etc.). Altering the reactor products can optionally include purifying the products (e.g., removing impurities, such as $SO_x$ and/or $NO_x$, from a reactor output stream). Altering the reactor products can additionally or alternatively include mixing additional gasses (and/or other substances) into a reactor output stream (and/or input stream), such as to achieve a desired output metric. In one variation, if the $CO:H_2$ ratio of the reactor output differs from a desired value, the ratio can be adjusted by mixing the reactor output with other gasses (e.g., substantially pure CO and/or $H_2$; another mixture of CO and $H_2$, such as previously produced and stored outputs of the reactor, the output of a second reactor, outputs and/or waste gasses of other systems, etc.). For example, the $CO:H_2$ ratio of the output stream (and/or gasses in any other portion of the reactor) can be monitored (e.g., continuously during reactor production), and deviations from the desired value can be compensated for by mixing in other gasses (e.g., adding CO and/or a CO-rich mixture to increase the ratio, adding $H_2$ and/or an $H_2$-rich mixture to decrease the ratio). This example preferably also includes altering the process conditions in order to correct the reactor outputs (e.g., as described above regarding closed-loop control). In a second variation, in which an external gas supply (e.g., the outputs and/or waste gasses of one or more other systems, such as a steel mill) is fed to a downstream consumer (e.g., a gas fermenter), the reactor products are used to alter the $CCP:H_2$ ratio (e.g., $CO:H_2$ ratio) of the external gas supply (e.g., if the $CCP:H_2$ ratio of the external gas supply differs from a desired value, mixing in the reactor products to achieve the desired value). For example, based on the deviation of the external gas supply from the desired value, the process conditions can be controlled to alter the $CO:H_2$ ratio of the reactor products (e.g., increasing the ratio in response to a CO-poor external gas supply, decreasing the ratio in response to a CO-rich external gas supply), and/or the quantity of reactor product mixed into the external gas supply can be controlled (e.g., to achieve the desired value). However, the reactor output stream can additionally or alternatively be altered in any other suitable manner, or can be used without alteration.

In some examples, the method includes determining one or more metrics (e.g., operation metrics) associated with the one or more upstream and/or downstream elements of the system (e.g., downstream reactors, upstream inputs, etc.). Such metrics can include, for example: reactor conditions such as temperature, pressure, etc.; downstream reactor and/or upstream source output metrics such as output quantity, composition, purity, etc.; metrics associated with other inputs for the downstream reactor(s), such as input quantity, composition, purity, etc.; reactor efficiency metrics; and/or any other suitable metrics. In such examples, the method preferably includes altering carbon dioxide reactor operation based on the metrics (e.g., to improve and/or maintain operation of the downstream reactor; to improve and/or maintain operation of the carbon dioxide reactor, such as to accommodate changes in the upstream source; to improve and/or maintain a target output metric, such as HCR or reduction product concentration, such as given a varying carbon dioxide source; etc.), such as by altering the HCR of the carbon dioxide reactor output. However, the method can additionally or alternatively include determining any other suitable metrics and/or acting (e.g., based on the metrics) in any other suitable manner.

4. PROCESS CONDITIONS

The process conditions can include: input carbon dioxide flow rate and/or pressure, input gas hydration, current density, voltage (e.g., preferably maintained between 1.5 V and 3 V, additionally or alternatively operated at less than 1.5 V, between 2 V-2.5 V, between 2 V-4 V, greater than 4 V, and/or at any other suitable voltage(s)), and/or temperature. The process conditions can additionally or alternatively include system configurations, such as gas diffusion layer aspects, catalyst aspects, flow field aspects, and/or PEM aspects. However, any other suitable process condition can be controlled or targeted. The process condition can be uncontrolled (e.g., dictated by an upstream system), controlled to meet a target value (e.g., wherein the target value can be determined based on the application receiving the reactor output, the instantaneous or anticipated reactor operation parameters, or otherwise determined), or otherwise determined.

The process conditions preferably include a pressure (e.g., input gas pressure, reactor pressure, etc.) greater than atmospheric pressure (e.g., within and/or greater than a threshold pressure range, such as 1-5, 5-10, 10-20, 20-50, 50-100, 100-300, 300-1000, 1-10, 5-50, 10-100, 20-500, and/or greater than 1000 atm, 14-50, 50-150, 100-300, 200-500, 500-1000, 750-1500, 1000-3000, 3000-10,000, 10,000-20,000, and/or greater than 20,000 psi, etc.) and/or greater than pressures typically feasible in electrolyzers other than gas-phase electrolyzers, but can additionally or alternatively include pressures substantially equal to 1 atmosphere, less than 1 atmosphere, and/or any other suitable pressures. The process conditions preferably include a temperature (e.g., reactor temperature) greater than typical room temperature (e.g., within and/or greater than a threshold temperature range, such as 25-50, 40-60, 50-100, 50-75, 70-100, and/or greater than 100° C., etc.) and/or greater than temperatures typically feasible in electrolyzers other than gas-phase electrolyzers, but can additionally or alternatively include temperatures substantially equal to room temperature (e.g., 20-30° C.), less than room temperature, and/or any other suitable temperatures. However, the process conditions can additionally or alternatively include any other suitable process conditions.

A higher carbon dioxide flow rate can lead to increased production of CCPs such as CO (e.g., due to greater availability of carbon dioxide for reduction), and thus an increased $CCP:H_2$ ratio (and correspondingly, lower carbon dioxide flow rate can lead to decreased CCP production and $CCP:H_2$ ratio). In some embodiments, higher carbon dioxide flow rate can also result in reduced carbon dioxide conversion efficiency, thereby diluting the output stream (e.g., syngas output) with unreacted carbon dioxide. For example, carbon dioxide flow rate (e.g., measured at the reactor inlet) can be maintained at one or more values in the range of 0.1-1000 sccm/cm$^2$ (e.g., 0.1-1, 1-10, 10-100, and/or 100-1000 sccm/cm$^2$).

In a first specific example of control based on input gas flow rate, reactor configuration A with a triple serpentine flow field is used, reactor pressure is substantially maintained at 120 psi, current density is substantially maintained at 500 mA/cm$^2$, and reactor temperature is substantially maintained at 30° C. In this specific example, substantially pure carbon dioxide gas is input at various flow rates, wherein input flow rates (e.g., measured at the reactor inlet) of 12 sccm/cm$^2$, 20 sccm/cm$^2$, and 40 sccm/cm$^2$ result in CO:H$_2$ ratios of approximately 1:1, 2:1.1, and 4:1, respectively.

In a second specific example of control based on input gas flow rate, reactor configuration A with a serpentine flow field is used, reactor pressure is substantially maintained at 130 psi, and current density is substantially maintained at 500 mA/cm$^2$. In this specific example, substantially pure carbon dioxide gas input at a 40 sccm/cm$^2$ flow rate results in a CO:H$_2$ ratio of approximately 8:2, whereas a 12 sccm/cm$^2$ flow rate results in an approximately 1:1 ratio.

Higher carbon dioxide pressure can lead to increased CCP fractional yield and/or CCP:H$_2$ ratio (and correspondingly, lower carbon dioxide pressure can lead to decreased CCP fractional yield and/or CCP:H$_2$ ratio). First, increased carbon dioxide pressure can result in greater availability of carbon dioxide for reduction, thereby increasing the total production of CCPs. Second, higher pressure at the catalyst can reduce water ingress to the catalyst (e.g., from the cathode), thereby lowering the amount of water available for reduction, which can directly increase the CCP:H$_2$ ratio and/or can reduce competition for catalyst reaction sites and/or reaction energy (e.g., thereby favoring reduction of carbon dioxide). Thus, in some embodiments (e.g., in which high CCP fractional yield and/or CCP:H$_2$ ratio is desired), high reactor pressure (e.g., greater than 100 psi, up to but no greater than a carbon dioxide phase transition pressure, such as a critical pressure of 1070 psi, etc.) may be employed. For example, reactor pressure can be maintained at one or more values in the range of 1-1100 psi (e.g., 1-10, 10-100, 100-300, 200-600, and/or 500-1100 psi), and/or at any other suitable pressure.

In a specific example of control based on reactor pressure, reactor configuration A with a single serpentine flow field is used, substantially pure carbon dioxide gas is input at 100 sccm/cm$^2$, current density is substantially maintained at 150 mA/cm$^2$, and reactor temperature is substantially maintained at 20° C. In this specific example, reactor pressure is substantially maintained at various pressures, wherein reactor pressures of 25, 50, 75, and 100 psi result in CO:H$_2$ ratios of approximately 3:2, 2.4:1, 3:1, and 5:1 and CO fractional yields of approximately 59%, 69%, 75%, and 84%, respectively.

Increasing input gas hydration can lead to increased water reduction (e.g., due to greater availability of water for reduction), and thus to a decreased CCP:H$_2$ ratio. For a substantially pure carbon dioxide input, only small amounts of water reach the catalyst (coming almost exclusively from the cathode side of the reactor), leading to a higher CCP:H$_2$ ratio. In contrast, when hydrated input gas is used, significant amounts of water from the input gas can reach the catalyst and react. For example, input gas hydration (e.g., proportion of water vapor in the input gas) can be maintained at one or more values in the range of 0% (e.g., substantially pure carbon dioxide, substantially unhydrated input gas) to 100% (e.g., 0-1, 1-3, 3-5, 5-7, 7-10, 10-15, 15-25, 25-50, 50-75, and/or 75-100 percent).

In a specific example of control based on input gas hydration, reactor configuration A with a single serpentine flow field is used, current density is substantially maintained at 50 mA/cm$^2$, reactor pressure is substantially maintained at 12 psi, and reactor temperature is substantially maintained at 20° C. In this specific example, carbon dioxide gas with varying amounts of hydration is input at 100 sccm/cm$^2$, wherein pure carbon dioxide input gas results in a CO:H$_2$ ratio of approximately 3:2, input gas with 12.2% hydration results in a CO:H$_2$ ratio of approximately 1:5.67, and intermediate hydration amounts result in CO:H$_2$ ratios between these two values.

Figure 4A:
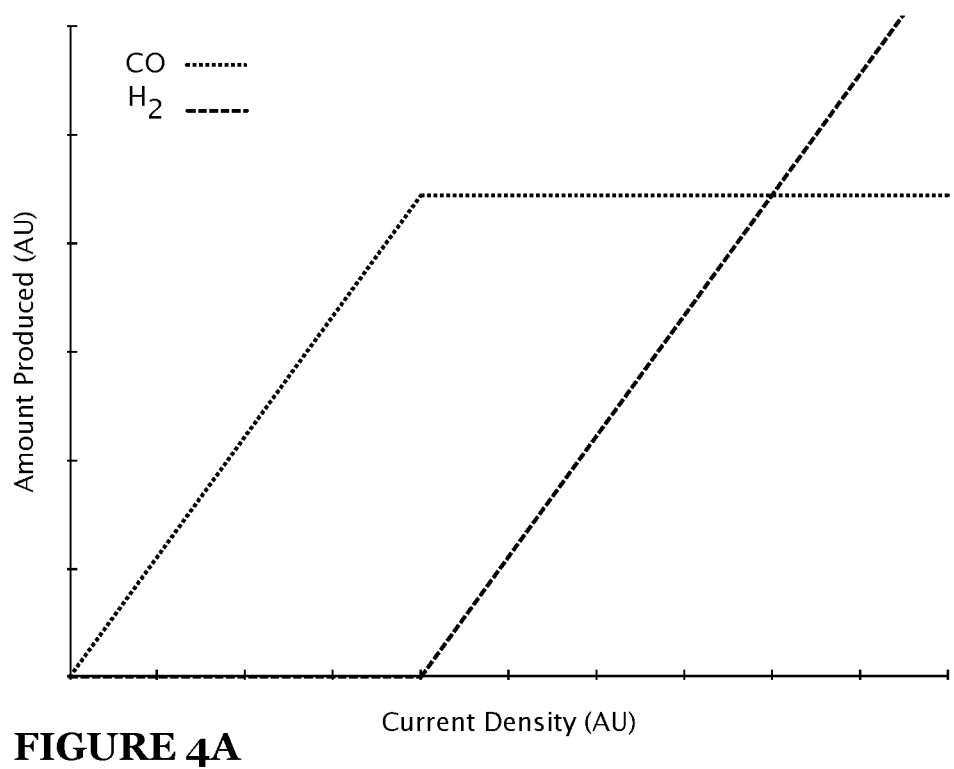
FIGS. 4A-4B are examples of idealized and non-idealized dependence of reactor outputs on current density, respectively.
Figure 4B:
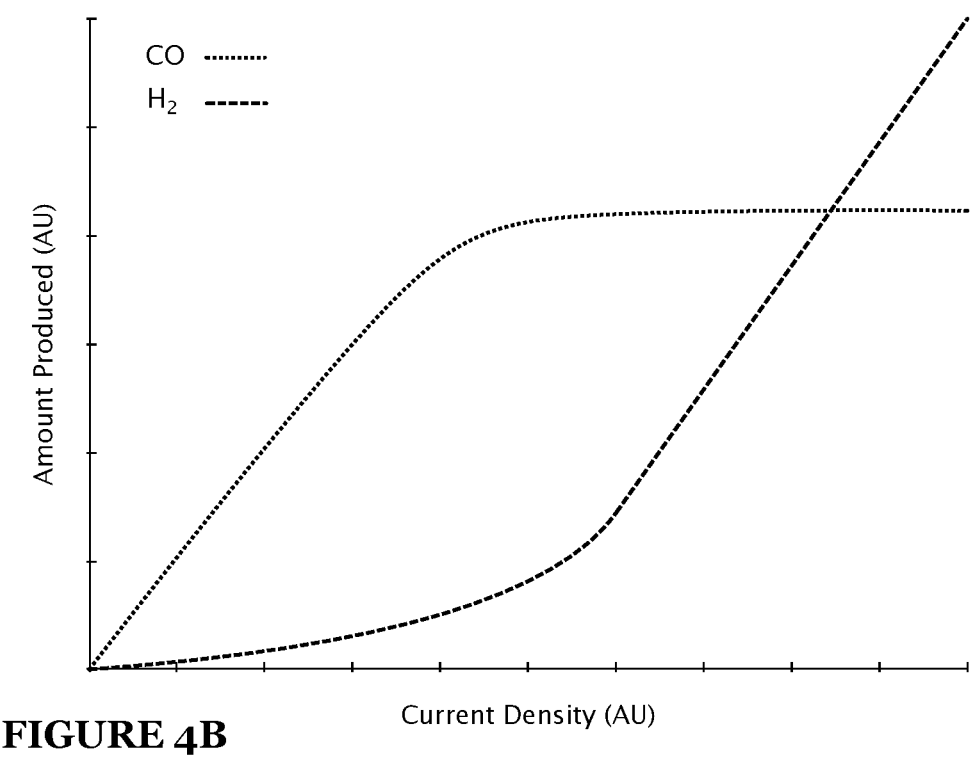

Reactors can exhibit different regimes of CCP and H$_2$ production with respect to current density. In an idealized reactor, at low current densities, no water reduction occurs and all current goes to reducing carbon dioxide, resulting in a substantially linear dependence of CO production on current and substantially no H$_2$ production; whereas at higher current densities, additional current (e.g., above a threshold current at which substantially all carbon dioxide is already being consumed) is used to reduce water, resulting in a substantially linear dependence of H$_2$ production on the additional current and substantially constant CO production (e.g., as shown in FIG. 4A). In many typical reactors, these idealities are loosened, but the two general regimes are still exhibited: CO production increases much faster than H$_2$ production in the low current density regime, then approaches a plateau in the higher current density regime while H$_2$ production increases more rapidly (e.g., as shown in FIG. 4B). The method can include controlling CO and/or H$_2$ production (e.g., controlling CO:H$_2$ ratio) by operating at any or all of a wide range of current densities (e.g., controlling the reactor operation within the low and/or high current density regime, etc.). In some embodiments, the use of gas phase input carbon dioxide can enable relatively high current densities (whereas reactors using aqueous carbon dioxide may be limited to current densities of tens of mA/cm$^2$ or less). For example, the method can include operating at current densities between 1 mA/cm$^2$ and 100 A/cm$^2$ (e.g., 1-75 mA/cm$^2$, 50-100 mA/cm$^2$, 100-200 mA/cm$^2$, 200-500 mA/cm$^2$, 500-1000 mA/cm$^2$, 50-1000 mA/cm$^2$, 0.5-10 A/cm$^2$, 1-2 A/cm$^2$, 2-5 A/cm$^2$, 5-10 A/cm$^2$, 5-100 A/cm$^2$, 10-20 A/cm$^2$, 20-50 A/cm$^2$, 50-100 A/cm$^2$, etc.; at, above, or below a threshold value such as 50 mA/cm$^2$, 65 mA/cm$^2$, 80 mA/cm$^2$, 90 mA/cm$^2$, 100 mA/cm$^2$, 110 mA/cm$^2$, 120 mA/cm$^2$, 130 mA/cm$^2$, 140 mA/cm$^2$, 150 mA/cm$^2$, 200 mA/cm$^2$, 300 mA/cm$^2$, 500 mA/cm$^2$, 700 mA/cm$^2$, 1000 mA/cm$^2$, 1500 mA/cm$^2$, etc.) and/or at any other suitable current densities.

In some embodiments, increased reactor temperature can result in a reduced CO:H$_2$ ratio (e.g., due to increased ingress of water from the cathode, increased reactivity of water, etc.). The method can include controlling reactor temperature within an operation range, such as a range between a minimum temperature (e.g., a water freezing temperature such as 0° C.) and a maximum temperature (e.g., 40° C., 50° C., 60° C., 75° C., etc.; a water boiling temperature such as 100° C.), in order to control CO:H$_2$ ratio and/or any other suitable output metrics.

In a specific example of control based on reactor temperature, reactor configuration A with a quadruple serpentine flow field is used, substantially pure carbon dioxide gas is input at 70 sccm/cm$^2$, current density is substantially maintained at 150 mA/cm$^2$, and reactor pressure is substantially maintained at 100 psi. In this specific example, reactor temperature is substantially maintained at various temperatures, wherein reactor temperatures of 26.7, 35, 38.7, and 41.9° C. result in CO:H$_2$ ratios of approximately 1:0.4, 2:1, 1:1.8, and 1:3, respectively.

Characteristics of the gas diffusion layer (GDL) can additionally or alternatively be used to affect CCP and/or H$_2$ production. For example, the GDL hydrophobicity can alter H$_2$ production (e.g., by affecting water transport), wherein a more hydrophilic GDL favors H$_2$ production (thereby reducing the CCP:H$_2$ ratio) and a more hydrophobic GDL inhibits H$_2$ production (thereby increasing the CCP:H$_2$ ratio). Other GDL characteristics, such as thickness and/or pore size, can also be used to alter the reactor output.

Characteristics of the membrane (e.g., polymer electrolyte membrane) can additionally or alternatively be used to affect CCP and/or H$_2$ production. In examples, an anion exchange membrane, which favors CCP production, can be used to achieve high CCP:H$_2$ ratios, a cation exchange membrane, which favors H$_2$ production, can be used to achieve low CCP:H$_2$ ratios, and hybrid membranes (e.g., enabling both anion and cation transport) exhibiting various anion and cation transport characteristics (e.g., mobilities) can be used to achieve various intermediate ratios (e.g., membranes favoring anion transport for higher ratios, membranes favoring cation transport for lower ratios).

Characteristics of the catalysts (e.g., particle size, catalyst species, etc.) can additionally or alternatively be used to affect CCP and/or H$_2$ production. For example, larger catalyst particles can result in poor carbon dioxide transport, thereby inhibiting CCP production and reducing the CCP:H$_2$ ratio, whereas smaller catalyst particles can favor CCP production, thereby increasing the ratio. The relative number of active sites with high turn over frequency for hydrogen evolution ("hydrogen sites") and those with high turn over frequency for carbon dioxide reduction ("carbon dioxide sites") can additionally or alternatively be dependent on catalyst particle size: larger catalyst particles typically have a higher ratio of hydrogen sites to carbon dioxide sites, favoring H$_2$ production, whereas smaller catalyst particles typically have a lower ratio, favoring CO production. The catalyst type (e.g., catalyst species) can additionally or alternatively be used to control the reactor output, such as by employing a mixture of one or more catalyst materials, wherein a first set of catalyst materials (e.g., gold) favor carbon dioxide reduction and a second set of catalyst materials (e.g., platinum) favor water reduction. In examples, a substantially pure gold catalyst can be used to achieve high CCP:H$_2$ ratios, a substantially pure platinum catalyst can be used to achieve low CCP:H$_2$ ratios, and gold-platinum mixtures (e.g., alloyed particles, mixtures of gold particles and platinum particles, etc.) of varying composition can be used to achieve various intermediate ratios (e.g., more gold for higher ratios, more platinum for lower ratios). The catalyst can additionally or alternatively include V, Cr, Mn, Fe, Co, Ni, Cu, Sn, Zr, Nb, Mo, Ru, Rh, Pd, Ag, Cd, Hf, Ta, W, Re, Ir, Hg, Al, Si, In, Ga, Tl, Pb, Bi, Sb, Te, Sm, Tb, Ce, Nd, and/or combinations thereof. The catalyst can additionally or alternatively be associated with (e.g., attached to, supported by, embedded in, adjacent, in contact with, etc.) one or more support structures (e.g., support particles, support matrix, etc.), preferably conductive support structures such as carbon, boron-doped diamond, and/or fluorine-doped tin oxide. However, the catalyst can additionally or alternatively include any other suitable materials.

In a specific example of control based on catalyst particle size, variations of reactor configuration A with two catalyst particle sizes are used, both with reactor temperature substantially maintained at 30° C., reactor pressure substantially maintained at 100 psi, an interdigitated flow field, substantially pure carbon dioxide gas input at 10 sccm/cm$^2$, and current density substantially maintained at 500 mA/cm$^2$. The first set of catalyst particles have a characteristic size of 4 nm (as in the standard reactor configuration A), resulting in an HCR of 1:1.6 and a voltage of 3.8 V. The second set of catalyst particles have a characteristic size of 20 nm, resulting in an HCR of 1:2.8 and a voltage of 4.2 V.

Characteristics of reactor cell compression can additionally or alternatively be used to affect CCP and/or H$_2$ production. In a specific example of control based on reactor cell compression, reactor configuration A is used with two different gasket thicknesses (resulting in greater compression for a larger gasket thickness), both with reactor temperature substantially maintained at 30° C., reactor pressure substantially maintained at 100 psi, a triple serpentine flow field, substantially pure carbon dioxide gas input at 40 sccm/cm$^2$, and current density substantially maintained at 500 mA/cm$^2$. The first gasket is 0.012 inches thick, resulting in an HCR of 1:4 and a voltage of 3.6 V. The second gasket is 0.010 inches thick, resulting in an HCR of 1:10.1 and a voltage of 3.8 V.

Characteristics of the flow field can additionally or alternatively be used to affect CCP and/or H$_2$ production. In a first specific example of control based on flow field characteristics, reactor configuration A is used under two different sets of process conditions, both with reactor temperature substantially maintained at 30° C. and reactor pressure substantially maintained at 120 psi. In the first set of conditions, an interdigitated flow field is used, substantially pure carbon dioxide gas is input at 10 sccm/cm$^2$, and current density is substantially maintained at 160 mA/cm$^2$, resulting in a CO:H$_2$ ratio of 1.6:1. In the second set of conditions, a quadruple serpentine flow field is used, substantially pure carbon dioxide gas is input at 40 sccm/cm$^2$, and current density is substantially maintained at 120 mA/cm$^2$, resulting in a CO:H$_2$ ratio of 18.5:1.

In a second specific example of control based on flow field characteristics, reactor configuration A is used under two different sets of process conditions, both with reactor temperature substantially maintained at 30° C., reactor pressure substantially maintained at 100 psi, substantially pure carbon dioxide gas input at 40 sccm/cm$^2$, and current density is substantially maintained at 500 mA/cm$^2$. In the first set of conditions, an interdigitated flow field is used and a voltage of 3.6 V is substantially maintained, resulting in a CO:H$_2$ ratio of 1.6:1. In the second set of conditions, a triple serpentine flow field is used and a voltage of 3.8 V is substantially maintained, resulting in a CO:H$_2$ ratio of 10.1:1.

However, any other suitable flow field can additionally or alternatively be employed to control the reactor outputs, the process conditions can additionally or alternatively include any other suitable reactor conditions, and the method can additionally or alternatively include controlling the reactor output in any suitable manner.

5. IMPURITY TOLERANCE

In some embodiments, such as embodiments in which the reactor is run at a high pressure and/or the catalyst is held at low voltage (e.g., negative voltage relative to the anode), the system and/or method may achieve high tolerance to impurities and/or dilute carbon dioxide inputs (e.g., as compared to other carbon dioxide reactors), such as tolerance to poisoning by impurities in the reactor input(s) and/or to inputs diluted by species such as methane, CO, $O_2$, and/or $N_2$. For example, the method can include determining target process conditions (e.g., reactor configuration such as PEM type, high target reactor pressure, etc.) to achieve impurity and/or dilute input tolerance (e.g., always selecting such process conditions; selecting such process conditions in response to a current and/or anticipated state of the reactor input, such as an impure and/or dilute state; etc.). These impurities can include species typically present in reactor input streams (e.g., products of coal and/or natural gas combustion, such as outputs from coal- or natural gas-fired power plants), such as $SO_x$ and/or $NO_x$, and/or can include any other suitable impurities. In one example, the system and/or method are capable of functioning effectively using input streams including up to 4% CO, 6% $O_2$, 10% $N_2$, 800 ppm $NO_x$, and/or 100 ppm $SO_x$, with a sum of CO, $O_2$, and $N_2$ impurities preferably no greater than 10%.

In a specific example of dilute input tolerance, reactor configuration A with a single serpentine flow field is used, current density is substantially maintained at 160 mA/cm$^2$, reactor pressure is substantially maintained at 110 psi, reactor temperature is substantially maintained at 20° C., and carbon dioxide-containing gasses with various levels of dilution in methane or nitrogen are input at 200 sccm/cm$^2$. In this specific example, reactor performance is highly tolerant of methane dilution up to at least 50% methane, wherein methane concentrations of 0%, 25%, and 50% result in CO:$H_2$ ratios between 9.5:1 and 8.5:1 and CO fractional yields greater than 90%. More significant performance reduction is observed using 75% methane, with a reduction in CO fractional yield to approximately 84%. In this specific example, similar tolerance to nitrogen dilution is observed, wherein nitrogen concentrations of 0%, 25%, 50%, and 75% result in CO:$H_2$ ratios between 9:1 and 8:1, and nitrogen concentrations up to 50% result in CO fractional yields greater than 85% (with 75% nitrogen concentration resulting in a CO fractional yield of approximately 81%).

In a specific example of impurity tolerance, reactor configuration A with a single serpentine flow field is used, current density is substantially maintained at 150 mA/cm$^2$, reactor pressure is substantially maintained at 100 psi, reactor temperature is substantially maintained between 20° C. and 25° C., and carbon dioxide-containing gasses with various impurities are input at 100 sccm/cm$^2$. In this specific example, reactor output metrics (e.g., CO fractional yield) under the various impurity conditions are compared to baseline reactor performance under the same conditions, but using a substantially impurity-free carbon dioxide input. In this specific example, reactor performance was shown not to deviate significantly from the baseline performance for CO concentrations of 4% or less, for $NO_x$ concentrations of 800 ppm or less, for $SO_x$ concentrations of 120 ppm or less, or for oxygen concentrations of 6% or less.

However, the system and/or method can additionally or alternatively exhibit any suitable tolerance to impure and/or dilute inputs, or exhibit no such tolerance.

6. SYSTEM CONFIGURATION SELECTION

The method can optionally include selecting one or more system configurations, preferably based on output HCR considerations, such as based on a desired output HCR (e.g., given a particular set of process conditions and/or a range of acceptable process conditions) and/or HCR range.

In some embodiments, this includes: at a first reactor (e.g., electrolyzer, preferably a gas-phase electrolyzer), accepting an input including carbon dioxide and electrochemically producing a first reduction product (e.g., including molecular hydrogen and/or one or more CCPs other than carbon dioxide at a first HCR) from the input (e.g., under a first set of process conditions); determining a desired HCR and/or HCR range (e.g., based on downstream reactor metrics, market price metrics, efficiency metrics, and/or any other suitable metrics); and selecting a system configuration (e.g., for a second reactor) based on the first HCR and/or the desired HCR (e.g., such that the second reactor will or can output a reduction product with an HCR closer to the desired HCR relative to the first HCR; preferably substantially under the first set of process conditions but additionally or alternatively under any other suitable process conditions). For example, the configuration for the second reactor can be selected such that the second reactor would, preferably under conditions substantially identical to those of the first reactor (e.g., while accepting the input under the first set of process conditions), produce a second reduction product from the input, wherein the second reduction product includes molecular hydrogen and the same CCSs as the first reduction product (e.g., includes substantially all species present in the first reduction product), wherein the second reduction product defines a second HCR substantially different from the first HCR, preferably wherein the second HCR is closer to the desired HCR than the first HCR. Substantial difference between the first HCR and second HCR, for this example and/or any other embodiment described herein, can include the second HCR: being closer to the desired HCR than the first HCR; differing from the first HCR (e.g., being greater or lesser than the first HCR) by at least 1%, 5%, 10%, 30%, 40%, 50%, 60%, 70%, 80%, 90%, 0.5-5%, 2-10%, 5-25%, 20-50%, 40-80%, and/or 75-100%; and/or otherwise differing from the first HCR.

In some embodiments, selecting system configurations can include selecting one or more aspects of a PEM, such as to alter the output HCR. Such selection can include selecting membrane compositions (e.g., different polymer species) and/or microstructures, selecting membrane layer thicknesses, and/or selecting any other suitable aspects of the PEM. In some examples, such selection includes selecting a thickness of an anion exchange membrane and/or proton exchange membrane (e.g., wherein a bipolar PEM with more AEM will tend to produce a lower output HCR than one with more proton exchange membrane). In a first specific example, selecting a thinner AEM (e.g., thinner than a reference AEM thickness such as a thickness of the first reactor AEM, thinner than an optimized AEM thickness substantially corresponding to optimal CCP production, etc.) can result in a reactor configured to produce a higher output HCR, whereas selecting a thicker AEM (e.g., thicker than the reference AEM thickness but preferably no thicker than the optimized AEM thickness) can result in a reactor configured to produce a lower output HCR.

Selecting system configurations can additionally or alternatively include selecting one or more aspects of reactor catalyst(s) (e.g., reduction catalyst, oxidation catalyst), such as to alter the output HCR. In some variations, selecting reactor catalyst aspects can include selecting a catalyst layer thickness (e.g., wherein a thicker reduction catalyst will tend to produce a higher HCR). In one example, selecting a thicker reduction catalyst layer (e.g., thicker than a reference reduction catalyst layer thickness such as a thickness of the first reactor reduction catalyst layer, thicker than an optimized reduction catalyst layer thickness substantially corresponding to optimal CCP production, etc.) can result in a reactor configured to produce a higher output HCR, whereas selecting a thinner reduction catalyst layer (e.g., thinner than the reference reduction catalyst layer thickness but preferably no thinner than the optimized reduction catalyst layer thickness) can result in a reactor configured to produce a lower output HCR.

Selecting reactor catalyst aspects can additionally or alternatively include (e.g., in embodiments in which a catalyst layer includes catalyst particles, preferably nanoparticles, defining a porous network) selecting a catalyst porosity (e.g., wherein a more porous reduction catalyst network will tend to produce a lower HCR). In one example, selecting a less porous reduction catalyst network (e.g., less porous than a reference reduction catalyst such as a porosity of the first reactor reduction catalyst network, less porous than an optimized reduction catalyst substantially corresponding to optimal CCP production, etc.) can result in a reactor configured to produce a higher output HCR, whereas selecting a more porous reduction catalyst (e.g., more porous than the reference reduction catalyst but preferably no more porous than the optimized reduction catalyst) can result in a reactor configured to produce a lower output HCR.

Selecting reactor catalyst aspects can additionally or alternatively include (e.g., in embodiments in which a catalyst layer includes catalyst particles, preferably nanoparticles, and one or more polymer electrolytes, such as wherein the catalyst particles define a porous network that contains the polymer electrolyte and/or are mixed into a medium including the polymer electrolyte) selecting a catalyst-to-polymer electrolyte ratio (CPR) (e.g., wherein a higher reduction catalyst CPR will tend to produce a higher HCR), such as by selecting a degree of polymer electrolyte loading into a porous reduction catalyst network. In one example, selecting a higher reduction catalyst CPR (e.g., higher CPR than a reference reduction catalyst CPR such as a CPR of the first reactor reduction catalyst network, higher CPR than an optimized reduction catalyst substantially corresponding to optimal CCP production, etc.) can result in a reactor configured to produce a higher output HCR, whereas selecting a lower CPR reduction catalyst (e.g., lower CPR than the reference reduction catalyst but preferably no lower than the optimized reduction catalyst CPR) can result in a reactor configured to produce a lower output HCR.

Selecting reactor catalyst aspects can additionally or alternatively include (e.g., in embodiments in which a catalyst layer includes catalyst particles, preferably nanoparticles) selecting a characteristic catalyst particle size (e.g., wherein a larger particle size will tend to produce a higher HCR). In one example, selecting a larger reduction catalyst particle size (e.g., larger than the particles of a reference reduction catalyst such as the first reactor reduction catalyst, larger than an optimized reduction catalyst substantially corresponding to optimal CCP production, etc.) can result in a reactor configured to produce a higher output HCR, whereas selecting a smaller reduction catalyst particle size (e.g., smaller than the particles of the reference reduction catalyst but preferably no smaller than the particles of the optimized reduction catalyst) can result in a reactor configured to produce a lower output HCR. However, the method can additionally or alternatively include selecting any other suitable reactor catalyst aspects.

The method can additionally or alternatively include selecting a reactor cell compression (e.g., wherein lower compression will tend to result in higher HCR and higher compression will tend to result in lower HCR), a flow field, and/or any other suitable aspects of the system.

7. APPENDIX

Additional information regarding optional embodiments and/or elements of the system and/or method are provided below.

A product gas from a carbon dioxide reactor of the invention can be used in one or more downstream processes. For example, a carbon dioxide reactor of the invention configured for syngas production can output a stream of CO, $H_2$, and/or $CO_2$. This output stream can be fed to an input of a bioreactor where microbes (e.g., *clostridium autoethanogenum, Clostridium carboxidovorans, Clostridium ljungdahlii, Clostridium ragsdalei, Clostridium thermoaceticum, Clostridium thermoautotrophicum, Eubacterium limosum, Peptostreptococcus productus*, Butyribacterium methylotrophicum, acetogens, *E. coli*, etc.) use the energy of CO, $H_2$, and/or some of the carbon contained in CO and $CO_2$ to make one or more bioproducts (e.g., ethanol, acetic acid, butanol, butyric acid, methane, etc.). Unutilized carbon can be released from an output of the downstream bioreactor (e.g., as $CO_2$, optionally along with water vapor and/or other volatile compounds).

$CO_2$ released an output of a downstream bioreactor can optionally be recycled back to an input of a carbon dioxide reactor of the invention (e.g., to increase the carbon efficiency of bioproduct production, to control carbon dioxide reactor operation, etc.). In some embodiments, it may be desirable to process this $CO_2$ before it enters (e.g., re-enters) a carbon dioxide reactor of the invention. For example, the water vapor may be removed, any volatile products that will inhibit carbon dioxide reactor function may be removed, and/or the $CO_2$ may be pressurized to the level desired for operation of a carbon dioxide reactor of the invention. Carbon dioxide leaving the bioreactor may be near atmospheric pressure and/or have any other suitable pressure, and typical carbon dioxide reactor pressures may be 20 psi to 800 psi, 50 psi to 400 psi, 100 psi to 500 psi, and/or any other suitable range. In some examples, water vapor is removed by a phase separator and/or a desiccant (e.g., a phase separator followed by a desiccant). In some examples, volatile products are removed by oxidation, adsorption onto a suitable adsorbent, and/or condensation. A $CO_2$ compressor can be used to raise the pressure of the $CO_2$ to the pressure suitable for a carbon dioxide reactor of the invention. If the carbon dioxide reactor is capable of running on low pressure $CO_2$ and is not inhibited by water vapor or any volatile compounds found in the $CO_2$ stream output from the downstream bioreactor, then the system can be simplified to remove unnecessary purification and compression systems and processes.

For each liter of culture media in the downstream bioreactor, a flow rate in the range of 1 sccm to 1000 sccm or 1 sccm to 2000 sccm or 10 sccm to 500 sccm or any other suitable range of gas from an output of a carbon dioxide reactor of the invention can be desirable. For each liter of culture media in the downstream bioreactor, $CO_2$ released can be in the range of 1 sccm to 2000 sccm or 10 sccm to 1000 sccm or 10 sccm to 500 sccm or any other suitable range. For each liter of culture media in the downstream bioreactor, water vapor in an output gas stream exiting the bioreactor may be 1%-2% of the stream by volume, 2%-5% of the stream by volume, 5%-10% of the stream by volume, 10%-25% of the stream by volume, 25% to 50% of the stream by volume, 50% to 90% of the stream by volume, and/or any other suitable amount. Volatile products leaving the downstream bioreactor may make up less than 0.1%, less than 0.5% of the stream by volume, less than 1% of the stream by volume, less than 4% of the stream by volume, and/or any other suitable amount of the stream.

Some microbial processes can use syngas produced by a carbon dioxide reactor of the invention. A syngas output stream of CO, $H_2$, and $CO_2$ may be used as a feedstock for a downstream bioreactor where microbial processes take place to make a range of useful compounds (examples include ethanol, acetic acid, butanol, butyric acid, methane). The syngas stream itself may not contain all the nutrients needed for the microbes in the downstream bioreactor to grow. The addition of other nutrients to the bioreactor may be required for the microbes to grow and produce products. Examples of suitable microbes include *clostridium autoethanogenum, Clostridium carboxidovorans, Clostridium ljungdahlii, Clostridium ragsdalei, Clostridium thermoaceticum, Clostridium thermoautotrophicum, Eubacterium limosum, Peptostreptococcus* productus, Butyribacterium methylotrophicum, acetogens, and/or *E. coli*.

One nutrient that can be particularly difficult to introduce to a downstream bioreactor is sulfur. Many microbes require sulfur for certain amino acid syntheses and enzymatic processes. A carbon dioxide reactor of the invention that is tolerant to sulfur may simplify the addition of sulfur to a downstream bioreactor (e.g., in addition to providing syngas to the downstream bioreactor). Sulfur in the form of one or more sulfur-containing species (SCSs) such as $H_2S$, $SO_2$, and/or other sulfur oxides ($SO_x$) can be present in the $CO_2$ gas fed to an input of a carbon dioxide reactor of the invention. $H_2S$ may pass through a carbon dioxide reactor of the invention unchanged and exit with the syngas output stream. The SCSs (e.g., $SO_2$ and/or $SO_N$) may pass through unchanged and/or they may be converted to one or more other SCSs (e.g., $H_2S$), and are preferably output with the syngas output stream. The syngas further comprising sulfur species (e.g., $H_2S$, $SO_2$, and/or $SO_x$) can then be fed to an input of a downstream bioreactor (e.g., without the need for additional sulfur nutrients). Sulfur species concentration can be in the range of 1 ppm-10 ppm, 5 ppm-50 ppm, 5 ppm-100 ppm, 10 ppm to 200 ppm, 20 ppm to 1000 ppm, and/or any other suitable range.

In some embodiments, the carbon dioxide reactor can be coupled to one or more gas fermentation reactors (e.g., downstream of the carbon dioxide reactor, such as accepting one or more products of the carbon dioxide reactor). The method can optionally include controlling reactor operation based on this coupling, such as to optimize for carbon efficiency and/or energy efficiency. Acetogens are most energy efficient with pure CO as the input, as seen in the energy balances shown in Table 1, and in many cases, exhibit the highest selectivity toward the desired end product as well. However, there are cases where an integrated electrochemical-gas fermentation system may be designed to utilize hydrogen-containing syngas for a number of reasons.

TABLE 1

| | | |
|---|---|---|
| 6 CO + 3 $H_2O$ ↔ $C_2H_5OH$ + 4 $CO_2$ | $\Delta G^{o'}$ = −217 kJ/mol | (1) |
| 3 CO + 3 $H_2$ ↔ $C_2H_5OH$ + $CO_2$ | $\Delta G^{o'}$ = −156.9 kJ/mol | (2) |
| 2 CO + 4 $H_2$ ↔ $C_2H_5OH$ + $H_2O$ | $\Delta G^{o'}$ = −136.8 kJ/mol | (3) |
| 2 $CO_2$ + 6 $H_2$ ↔ $C_2H_5OH$ + 3 $H_2O$ | $\Delta G^{o'}$ = −96.7 kJ/mol | (4) |

Using CO for most or all of the electron transfer chemistry in a downstream bioreactor typically results in the production of $CO_2$, which can then be vented in an output stream of the bioreactor. Typically, as the ratio of hydrogen in the syngas is increased, less $CO_2$ is produced, and $CO_2$ byproduct can be eliminated stoichiometrically above a certain ratio of hydrogen to carbon monoxide. In the case of gas fermentation to ethanol, for example, a CO:$H_2$ ratio less than 1:2 will typically result in the incorporation of all input carbon into the ethanol end product. Hence, tuning the CO:$H_2$ ratio in the output stream of a carbon dioxide reactor of the invention could enable an operator to optimize for carbon efficiency (e.g., to minimize $CO_2$ emissions) by shifting toward more $H_2$ production and/or to optimize for energy efficiency by shifting toward higher CO production. Monitoring input costs, such as time of day electricity prices or incentives for carbon utilization, could inform the optimal operating parameters at any time. Tuning production in this manner could also change the outputs, for example by driving toward greater ethanol production (e.g., higher CO) or greater acetate production (e.g., higher $H_2$). Monitoring market prices of outputs could inform the optimal operating parameters at any given time (e.g., wherein the operating parameters are determined based on the market prices, such as to optimize the market price of the products or to optimize total profit from reactor operation).

However, the system and/or method can additionally or alternatively include any other suitable elements.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for electrolyzer control comprising, at a gas-phase electrolyzer, electrochemically producing a reduction product comprising molecular hydrogen and a carbon-containing species (CCS) from an input comprising gas-phase carbon dioxide, wherein the CCS is a product of the electrochemical reduction of carbon dioxide, wherein the gas-phase electrolyzer comprises a cathode layer having a reduction catalyst and an ion-conducting polymer in contact with a polymer electrolyte membrane and electrochemically producing the reduction product comprises:
during a first time interval, producing the reduction product with a first molecular hydrogen-to-CCS ratio (HCR), comprising operating the gas-phase electrolyzer including the reduction catalyst under a first set of process conditions; and
during a second time interval after the first time interval, adjusting electrolyzer operation to change the reduction product HCR, comprising operating the gas-phase electrolyzer including the reduction catalyst used during the first time interval under a second set of process conditions to produce the reduction product with a second HCR that differs from the first HCR by at least 1%.

2. The method of claim 1, wherein:
during the first time interval, the input defines a first input gas hydration;
adjusting electrolyzer operation comprises altering the input gas hydration such that, during the second time interval, the input defines an input gas hydration greater than the first input gas hydration and
the second HCR is greater than the first HCR.

3. The method of claim 1, wherein adjusting electrolyzer operation to change the reduction product HCR is performed in response to determining a desired HCR different from the first HCR.

4. The method of claim 3, further comprising:
providing the reduction product to a downstream reactor; and
determining an operation metric associated with the downstream reactor;
wherein determining the desired HCR is performed based on the operation metric.

5. The method of claim 4, wherein:
the downstream reactor is a bioreactor;
the input further comprises a sulfur-containing species (SCS), wherein a concentration of the SCS in the input is at least 5 ppm; and
the method further comprises providing the SCS, intermixed with the reduction product, to the bioreactor.

6. The method of claim 1, wherein:
the first set of process conditions comprises a first electrolyzer temperature greater than 50° C. and a first input pressure greater than 10 atmospheres; and
the second set of process conditions comprises a second electrolyzer temperature greater than 50° C. and a second input pressure greater than 10 atmospheres.

7. The method of claim 1, wherein:
during the first time interval, the input defines a first gas-phase carbon dioxide flow rate; and
adjusting electrolyzer operation comprises altering the input gas-phase carbon dioxide flow rate such that, during the second time interval, the input defines a second phase carbon dioxide flow rate different than the first phase carbon dioxide flow rate.

8. The method of claim 1, wherein:
adjusting electrolyzer operation comprises altering the current density.

9. The method of claim 1, wherein:
adjusting electrolyzer operation comprises altering the reactor pressure or input gas pressure.

10. The method of claim 1, wherein:
adjusting electrolyzer operation comprises altering the reactor temperature.

11. The method of claim 1, wherein the second HCR differs from the first HCR by 75-100%.

12. The method of claim 1, wherein the second HCR differs from the first HCR by 40%-80%.

13. The method of claim 1, wherein the second HCR differs from the first HCR by 20%-50%.

14. The method of claim 1, wherein the second HCR differs from the first HCR by 5%-25%.

15. The method of claim 1, wherein the wherein the second HCR differs from the first HCR by 2%-10%.

16. The method of claim 1, wherein the wherein the second HCR differs from the first HCR by at least 5%.

17. The method of claim 1, wherein the wherein the second HCR differs from the first HCR by at least 10%.

18. The method of claim 1, wherein the during the second time interval, the input is substantially pure $CO_2$.

19. The method of claim 1, wherein during the second time interval, the input is substantially pure $CO_2$ that is hydrated.

20. The method of claim 1, wherein the input during at least the first time interval comprises a sulfur-containing species (SCS), wherein a concentration of the SCS in the input is at least 5 ppm.

21. The method of claim 20, wherein a SCS is intermixed with the reduction product during at least the first time interval.

22. The method of claim 1, wherein the reduction product is provided in an output stream, the output stream further comprising unreacted $CO_2$.

23. The method of claim 1, wherein the reduction product comprises syngas.

24. The method of claim 1, wherein the reduction product is provided to a downstream bioreactor.

25. The method of claim 1, wherein the reduction product is provided in an output stream, and further comprising providing the output stream to a downstream system.

26. The method of claim 25, wherein the entirety of the output stream is provided to the downstream system.

27. The method of claim 1, wherein the polymer electrolyte membrane is a bipolar membrane.

28. The method of claim 1, wherein the polymer electrolyte membrane is a monopolar membrane.

29. The method of claim 1, wherein:
the first set of process conditions comprise a first input pressure greater than 100 psi; and
the second set of process conditions comprises second input pressure greater than 100 psi.

30. The method of claim 29, wherein:
the first set of process conditions comprise a first input temperature greater than 25° C.; and the second set of process conditions comprises second input temperature greater than 25° C.

31. The method of claim 1, where the CCS is carbon monoxide (CO).

32. A method for electrolyzer control comprising, at a gas-phase electrolyzer, electrochemically producing a reduction product comprising molecular hydrogen and a carbon-containing species (CCS) from an input comprising gas-phase carbon dioxide, wherein the CCS is a product of the electrochemical reduction of carbon dioxide, wherein electrochemically producing the reduction product comprises:

during a first time interval, producing the reduction product with a first molecular hydrogen-to-CCS ratio (HCR), comprising operating the gas-phase electrolyzer under a first set of process conditions; and during a second time interval after the first time interval, adjusting electrolyzer operation to change the reduction product HCR, comprising operating the gas-phase electrolyzer under a second set of process conditions to produce the reduction product with a second HCR that differs from the first HCR by at least 1%, wherein the input during at least one of the first time interval and the second time interval comprises a sulfur-containing species (SCS), wherein a concentration of the SCS in the input is at least 5 ppm.

33. The method of claim 32, wherein the SCS is intermixed with the reduction product during the least one of first time interval and the second time interval.

* * * * *